Patented Apr. 9, 1935

1,997,145

UNITED STATES PATENT OFFICE 1,997,145

RECOVERY OF HYDROCARBONS FROM GASES CONTAINING CONSTITUENTS, SUCH AS DIOLEFINES AND THE LIKE

Willy Herbert, Frankfort-on-the-Main, Germany, assignor to American Lurgi Corporation, New York, N. Y., a corporation of New York No Drawing. Application December 7, 1932, Serial No. 646,213. In Germany December 21, 1931

11 Claims. (Cl. 183—4)

The present invention relates to the recovery of hydrocarbons from gases containing constituents, such as diolefines and the like, which are capable, as the result of polymerization or resinification, of exerting an injurious influence on the adsorptive media (such as active carbon, silica gel and the like) employed.

It is known that, in the recovery of benzol, for example, from coal gas under the usual working conditions of gasworks practice, and with the employment of active carbon as adsorptive medium, a decrease in the adsorptive efficiency of the carbon can be observed after a certain amount of benzol has been recovered.

This circumstance is attributable to the deposition of certain substances which, by reaction with the substances with which they are laden, by polymerization or by further transformation, act injuriously on the working efficiency of the adsorptive media. It was assumed, that the extent of the reduction of the adsorptive efficiency is dependent on the amount of gas passed, or the constituents deposited therefrom, and that, in maintaining the conditions determined by the plant as a whole, especially with regard to the pressure and rate of flow of the gas, the consumption of adsorptive media could be expected to depend on the quantity of the substances adsorbed.

It has, however, been ascertained in accordance with the present invention that the resinification phenomenon does not depend on the amount of the gases passed through the adsorptive media, but is substantially a function of time, inasmuch as the resinification of the substances liable thereto leads to the formation of products that are increasingly difficult to expel, the longer the substances have the opportunity of remaining in contact with the adsorptive media. In other words, if in the treatment of a certain gas mixture, such as petroleum refinery gases, the gases are contacted with the adsorbent and the adsorbed material is allowed to remain in contact with the adsorbent for several hours before being expelled in the regeneration process, a polymerization of the adsorbed material occurs resulting in a deposit of polymerization product in the adsorbent which cannot be expelled. Thus the adsorbent becomes clogged and its efficiency reduced. If, on the other hand, according to the present invention, the adsorbing and regenerating operations are carried out quickly so that the adsorbed material does not remain in contact with the adsorptive material for more than, say, one hour, no appreciable amount of deposition of unexpellable material on the adsorbent occurs, clogging of the adsorbent is avoided and its adsorptive efficiency is preserved.

The result of this recognition is that, by taking care to minimize the duration of contact between the resinifiable substances and the adsorptive media, the output efficiency of such plants can be improved.

In carrying the present invention into practical effect the amount of adsorptive media employed in a plant of a given capacity is reduced below the usual level, so that, in consequence, the proportion of adsorptive medium to the amount of the hydrocarbons contained in the gases to be treated per diem, is smaller than corresponds to the usual minimum ratio 2:1. The further that proportion is reduced, the better for the purpose in view. In practice, proportions of 1.5:1—and preferably still smaller for instance, between 1:1 and 0.1:1—can be employed with advantage. In other words, if, for example, the amount of adsorptive media hitherto employed for the recoverable hydrocarbons was about 2000 kgs. of carbon per 1000 kgs. of recoverable hydrocarbon per diem, the amount of carbon employed according to the process of the present invention will be, for example, 1500 kgs., or preferably still smaller, such as 100-500 kgs.

In the treatment of hydrocarbons from distillation plants, refinery gases and such gases as result from the decomposition or cracking of oils, the specified relative proportions can be applied, with particular advantage by increasing the velocity of flow of the gases through the adsorptive media.

In itself, an increase in the rate of passage of the gases under treatment, would be open to the objection that it would entail certain not unimportant modifications in the operative conditions as compared, for example, with those of ordinary gasworks practice. For example, the introduction of high velocities must, in most instances, be accompanied by the provision of a special blower.

It has, however, transpired that such objections, although capable of being primarily urged against increasing the velocity of the gases, necessarily fall out of consideration in the face of the considerable advantage resulting, in particular, from the important increase in the efficiency of the adsorptive medium, and from the possibility of reducing the size of the whole plant in consequence of the increased velocity of the gases.

The extent by which the period of contact between the gases, or the adsorbed substances, and the adsorptive medium can be shortened by increasing the rate of flow, or in any other way, such as by reducing the depth of the adsorptive layer to less than 1 meter and preferably less than 0.7 meter, and also, if desired, by reducing the grain-size of the adsorptive medium at the same time to less than 3 mm.—whilst maintaining the rate of flow, or the like, at a normal level, not exceeding that hitherto employed—depends, in detail, on the amount and nature of the substances to be precipitated, and on other operative conditions. In general, velocities exceeding 12 cms. per second, and especially those between 15 and 80 cms. per second—preferably 20 to 40 cms. per second—have been found suitable. Instead of increasing the rate of flow, however, the depth of the layer, accompanied by a reduction in the grain size of the adsorptive medium, may be reduced.

It is sometimes advisable to shorten, as far as possible, the period of exposure to the media, such as steam, employed for treating the laden adsorptive medium in order, for example, to expel the adsorbed substances, and therefore to minimize the length of the regenerative treatment, for example to less than three quarters of an hour, and preferably less than half an hour. The determinative factor is, in particular, the more or less complete prevention of the formation of resins and other polymerization products under the influence of high temperature and of the adsorptive medium, which is generally catalytic, that is to say, to expel the adsorbed substances as rapidly as the other working conditions will admit, in order that the substances liable to resinification may have the least possible opportunity of transformation.

The measures hereinbefore described may be applied either singly or in combination.

In particular by following the prescribed working instructions, the output capacity of the plant and, for example, the number of steaming out operations the adsorptive material can undergo before becoming exhausted, can be increased thereby reducing the consumption of adsorptive media.

The following example illustrates the invention:

In a benzol recovery plant in which 300,000 cbm. of gas containing 1000 kg. of benzol are to be treated each day, it has previously been the practice to use two adsorbers, each containing 1200 kg. of active carbon. The active carbon has an adsorptive capacity at the start of 21% so that each adsorber at each cycle recovers about 250 kg. of benzol. Thus the two adsorbers recover about 500 kg. of benzol at each cycle and it is necessary to carry out two cycles per day in order to recover the whole 1000 kg. of benzol. Each cycle then takes 12 hours. In the operation of this process the adsorptive capacity of the active carbon is reduced in 200–300 cycles from its original 21% to about 5% when it must be discarded. The ratio of adsorbent to material recovered in this process is 2.4 to 1.

In accordance with the present invention the process is carried out as follows: The adsorbers are charged with only 200 kg. of active carbon each. This carbon has an adsorptive capacity of 21% so that about 42 kg. of benzol is recovered at each cycle of each adsorber. In order to recover the 1000 kg. of benzol each adsorber must therefore operate about 12 cycles per day so that each cycle of charging and regeneration is about 2 hours instead of 12 hours as in the prior process. In this short time the polymerizable adsorbed substances either do not polymerize or do not polymerize sufficiently to deposit on the active carbon and reduce its efficiency. The ratio of adsorptive material to material recovered in this process is 0.4 to 1.

I claim:

1. A process for the recovery of hydrocarbons from gases containing substances with a tendency to polymerize, which comprises passing said gases through solid adsorptive media and reducing the proportion of said adsorptive media used to the amount of hydrocarbons recoverable from the gases under treatment per day to below 2:1.

2. A process for the recovery of hydrocarbons from gases containing substances with a tendency to polymerize, which comprises passing said gases through solid adsorptive media and reducing the proportion of said adsorptive media used to the amount of hydrocarbons recoverable from the gases under treatment per day to not more than 1.5; 1.

3. A process for the recovery of hydrocarbons from gases containing substances with a tendency to polymerize, which comprises passing said gases through solid adsorptive media and reducing the proportion of said adsorptive media used to the amount of hydrocarbons recoverable from the gases under treatment per day to between 1:1 and 0.1:1.

4. A process for the recovery of hydrocarbons from gases containing substances with a tendency to polymerize, which comprises passing said gases through active carbon, and reducing the proportion of said adsorptive media used to the amount of hydrocarbons recoverable from the gases under treatment per day to below 2:1.

5. A process for the recovery of hydrocarbons from gases containing substances with a tendency to polymerize, which comprises passing said gases through silica gel and reducing the proportion of said adsorptive media used to the amount of hydrocarbons recoverable from the gases under treatment per day to below 2:1.

6. A process for the recovery of hydrocarbons from gases containing substances with a tendency to polymerize, which comprises passing said gases through solid adsorptive media with a velocity of above 20 cms. per second and reducing the proportion of said adsorptive media used to the amount of hydrocarbons recoverable from the gases under treatment per day to below 2:1.

7. A process for the recovery of hydrocarbons from gases containing substances with a tendency to polymerize, which comprises passing said gases through shallow layers of solid adsorptive media below 1 meter in depth with a velocity of above 20 cms. per second and reducing the proportion of said adsorptive media used to the amount of hydrocarbons recoverable from the gases under treatment per day to below 2:1.

8. A process for the recovery of hydrocarbons from gases containing substances with a tendency to polymerize, which comprises passing said gases through shallow layers of solid adsorptive media below 0.7 meters in depth with a velocity of above 20 cms. per second and reducing the proportion of said adsorptive media used to the amount of hydrocarbons recoverable from the gases under treatment per day to below 2:1.

9. A process for the recovery of hydrocarbons from gases containing substances with a tendnecy to polymerize, which comprises passing said gases through shallow layers of solid adsorptive media below 1 meter in depth of reduced grain size, smaller than 3 mms. with a velocity of above 20 cms. per second and reducing the proportion of said adsorptive media used to the amount of hydrocarbons recoverable from the gases under treatment per day to below 2:1.

10. A process for the recovery of hydrocarbons from gases containing substances with a tendency to polymerize, which comprises passing said gases through shallow layers of solid adsorptive media below 1 meter in depth and using a regenerative period of less than 45 minutes for the adsorptive media and reducing the proportion of said adsorptive media used to the amount of hydrocarbons recoverable from the gases under treatment per day to below 2:1.

11. A process for the recovery of hydrocarbons from gases containing substances with a tendency to polymerize, which comprises passing said gases through shallow layers of solid adsorptive media below 1 meter in depth and using a regenerative period of less than 30 minutes for the adsorptive media and reducing the proportion of said adsorptive media used to the amount of hydrocarbons recoverable from the gases under treatment per day to below 2:1.

WILLY HERBERT.